US007146315B2

(12) United States Patent
Balan et al.

(10) Patent No.: US 7,146,315 B2
(45) Date of Patent: Dec. 5, 2006

(54) MULTICHANNEL VOICE DETECTION IN ADVERSE ENVIRONMENTS

(75) Inventors: Radu Victor Balan, Levittown, PA (US); Justinian Rosca, Princeton Junction, NJ (US); Christophe Beaugeant, Münich (DE)

(73) Assignee: Siemens Corporate Research, Inc., Princeton, NJ (US)

( * ) Notice: Subject to any disclaimer, the term of this patent is extended or adjusted under 35 U.S.C. 154(b) by 925 days.

(21) Appl. No.: 10/231,613

(22) Filed: Aug. 30, 2002

(65) Prior Publication Data

US 2004/0042626 A1 Mar. 4, 2004

(51) Int. Cl.
*G10L 15/20* (2006.01)

(52) U.S. Cl. ..................... 704/233; 704/247; 381/94.3; 381/56; 381/110; 379/406.04

(58) Field of Classification Search ........ 704/225–228, 704/233, 247, 275; 381/94.3, 56, 110; 379/406.04
See application file for complete search history.

(56) References Cited

U.S. PATENT DOCUMENTS 5,012,519 A * 4/1991 Adlersberg et al. .......... 704/226
5,276,765 A * 1/1994 Freeman et al. ............ 704/233
5,550,924 A * 8/1996 Helf et al. .................. 381/94.3
5,563,944 A * 10/1996 Hasegawa .............. 379/406.04
5,839,101 A * 11/1998 Vahatalo et al. ............ 704/226
6,011,853 A * 1/2000 Koski et al. .................. 381/56
6,070,140 A * 5/2000 Tran ........................... 704/275
6,088,668 A * 7/2000 Zack .......................... 704/225
6,097,820 A * 8/2000 Turner ........................ 381/94.3
6,141,426 A * 10/2000 Stobba et al. ............... 381/110
6,363,345 B1 * 3/2002 Marash et al. .............. 704/226
6,377,637 B1 * 4/2002 Berdugo ...................... 375/346
2003/0004720 A1 * 1/2003 Garudadri et al. .......... 704/247

FOREIGN PATENT DOCUMENTS

EP 1081985 7/2001

OTHER PUBLICATIONS

Rosca et al.: "Multichannel voice detection in adverse environments" XI European Signal Processing Conference EUSIPCO Sep. 2, 2002, XP008025382.

(Continued)

*Primary Examiner*—Vijay B. Chawan
(74) *Attorney, Agent, or Firm*—Donald B. Paschburg; F. Chau & Associates, LLC.

(57) ABSTRACT

A multichannel source activity detection system, e.g., a voice activity detection (VAD) system, and method that exploits spatial localization of a target audio source is provided. The method includes the steps of receiving a mixed sound signal by at least two microphones; Fast Fourier transforming each received mixed sound signal into the frequency domain; filtering the transformed signals to output a signal corresponding to a spatial signature of a source; summing an absolute value squared of the filtered signal over a predetermined range of frequencies; and comparing the sum to a threshold to determine if a voice is present. Additionally, the filtering step includes multiplying the transformed signals by an inverse of a noise spectral power matrix, a vector of channel transfer function ratios, and a source signal spectral power.

22 Claims, 6 Drawing Sheets

OTHER PUBLICATIONS

Aalburg et al.: "Single-and two-channel noise reduction for robust speech recognition in car" ISCA Workshop Multi-Modal Dialogue in Mobile Environments Jun. 2002 XP002264041.

Balan R et al.: "Microphone array speech enhancement by Bayesian estimation of spectral amplitude and phase" Aug. 2002 pp. 209-213, XP010635740.

Philippe Renevey et al.: "Entropy Based Voice Activity Detection in very noisy conditions" Eurospeech 2001 Proceedings vol. 3, Sep. 2001 pp. 1887-1890 XP007004739.

Srinivasan K et al.: "Voice activity detection for cellular networks" Proceedings of the IEEE Workshop on Speech Coding for Telecommunications Oct. 1993 pp. 85-86 XP002204645.

International Search Report.

* cited by examiner

MULTICHANNEL VOICE DETECTION IN ADVERSE ENVIRONMENTS

BACKGROUND OF THE INVENTION

1. Field of the Invention

The present invention relates generally to digital signal processing systems, and more particularly, to a system and method for voice activity detection in adverse environments, e.g., noisy environments.

2. Description of the Related Art

The voice (and more generally acoustic source) activity detection (VAD) is a cornerstone problem in signal processing practice, and often, it has a stronger influence on the overall performance of a system than any other component. Speech coding, multimedia communication (voice and data), speech enhancement in noisy conditions and speech recognition are important applications where a good VAD method or system can substantially increase the performance of the respective system. The role of a VAD method is basically to extract features of an acoustic signal that emphasize differences between speech and noise and then classify them to take a final VAD decision. The variety and the varying nature of speech and background noises makes the VAD problem challenging.

Traditionally, VAD methods use energy criteria such as SNR (signal-to-noise ratio) estimation based on long-term noise estimation, such as disclosed in K. Srinivasan and A. Gersho, *Voice activity detection for cellular networks,* in Proc. Of the IEEE Speech Coding Workshop, October 1993, pp. 85–86. Improvements proposed use a statistical model of the audio signal and derive the likelihood ratio as disclosed in Y. D. Cho, K Al-Naimi, and A. Kondoz, *Improved voice activity detection based on a smoothed statistical likelihood ratio,* in Proceedings ICASSP 2001, IEEE Press, or compute the kurtosis as disclosed in R. Goubran, E. Nemer and S. Mahmoud, *Snr estimation of speech signals using subbands and fourth-order statistics,* IEEE Signal Processing Letters, vol. 6, no. 7, pp. 171–174, July 1999. Alternatively, other VAD methods attempt to extract robust features (e.g. the presence of a pitch, the formant shape, or the cepstrum) and compare them to a speech model. Recently, multiple channel (e.g., multiple microphones or sensors) VAD algorithms have been investigated to take advantage of the extra information provided by the additional sensors.

SUMMARY OF THE INVENTION

Detecting when voices are or are not present is an outstanding problem for speech transmission, enhancement and recognition. Here, a novel multichannel source activity detection system, e.g., a voice activity detection (VAD) system, that exploits spatial localization of a target audio source is provided. The VAD system uses an array signal processing technique to maximize the signal-to-interference ratio for the target source thus decreasing the activity detection error rate. The system uses outputs of at least two microphones placed in a noisy environment, e.g., a car, and outputs a binary signal (0/1) corresponding to the absence (0) or presence (1) of a driver's and/or passenger's voice signals. The VAD output can be used by other signal processing components, for instance, to enhance the voice signal.

According to one aspect of the present invention, a method for determining if a voice is present in a mixed sound signal is provided. The method includes the steps of receiving the mixed sound signal by at least two microphones; Fast Fourier transforming each received mixed sound signal into the frequency domain; filtering the transformed signals to output a signal corresponding to a spatial signature for each of the transformed signals; summing an absolute value squared of the filtered signals over a predetermined range of frequencies; and comparing the sum to a threshold to determine if a voice is present, wherein if the sum is greater than or equal to the threshold, a voice is present, and if the sum is less than the threshold, a voice is not present. Additionally, the filtering step includes multiplying the transformed signals by an inverse of a noise spectral power matrix, a vector of channel transfer function ratios, and a source signal spectral power.

According to another aspects of the present invention, a method for determining if a voice is present in a mixed sound signal includes the steps of receiving the mixed sound signal by at least two microphones; Fast Fourier transforming each received mixed sound signal into the frequency domain; filtering the transformed signals to output signals corresponding to a spatial signature for each of a predetermined number of users; summing separately for each of the users an absolute value squared of the filtered signals over a predetermined range of frequencies; determining a maximum of the sums; and comparing the maximum sum to a threshold to determine if a voice is present, wherein if the sum is greater than or equal to the threshold, a voice is present, and if the sum is less than the threshold, a voice is not present, wherein if a voice is present, a specific user associated with the maximum sum is determined to be the active speaker. The threshold is adapted with the received mixed sound signal.

According to a further embodiment of the present invention, a voice activity detector for determining if a voice is present in a mixed sound signal is provided. The voice activity detector including at least two microphones for receiving the mixed sound signal; a Fast Fourier transformer for transforming each received mixed sound signal into the frequency domain; a filter for filtering the transformed signals to output a signal corresponding to an estimated spatial signature of a speaker; a first summer for summing an absolute value squared of the filtered signal over a predetermined range of frequencies; and a comparator for comparing the sum to a threshold to determine if a voice is present, wherein if the sum is greater than or equal to the threshold, a voice is present, and if the sum is less than the threshold, a voice is not present.

According to yet another aspect of the present invention, a voice activity detector for determining if a voice is present in a mixed sound signal includes at least two microphones for receiving the mixed sound signal; a Fast Fourier transformer for transforming each received mixed sound signal into the frequency domain; at least one filter for filtering the transformed signals to output a signal corresponding to a spatial signature of a speaker for each of a predetermined number of users; at least one first summer for summing separately for each of the users an absolute value squared of the filtered signal over a predetermined range of frequencies; a processor for determining a maximum of the sums; and a comparator for comparing the maximum sum to a threshold to determine if a voice is present, wherein if the sum is greater than or equal to the threshold, a voice is present, and if the sum is less than the threshold, a voice is not present, wherein if a voice is present, a specific user associated with the maximum sum is determined to be the active speaker.

BRIEF DESCRIPTION OF THE DRAWINGS

The above and other objects, features, and advantages of the present invention will become more apparent in light of the following detailed description when taken in conjunction with the accompanying drawings in which:

FIG. 1A illustrates a scenario using two fixed inside-the-car microphones and FIG. 1B illustrates the scenario of using one fixed microphone and a second microphone contained in a mobile phone;

DETAILED DESCRIPTION OF THE PREFERRED EMBODIMENTS

Preferred embodiments of the present invention will be described herein below with reference to the accompanying drawings. In the following description, well-known functions or constructions are not described in detail to avoid obscuring the invention in unnecessary detail.

Figure 1A:
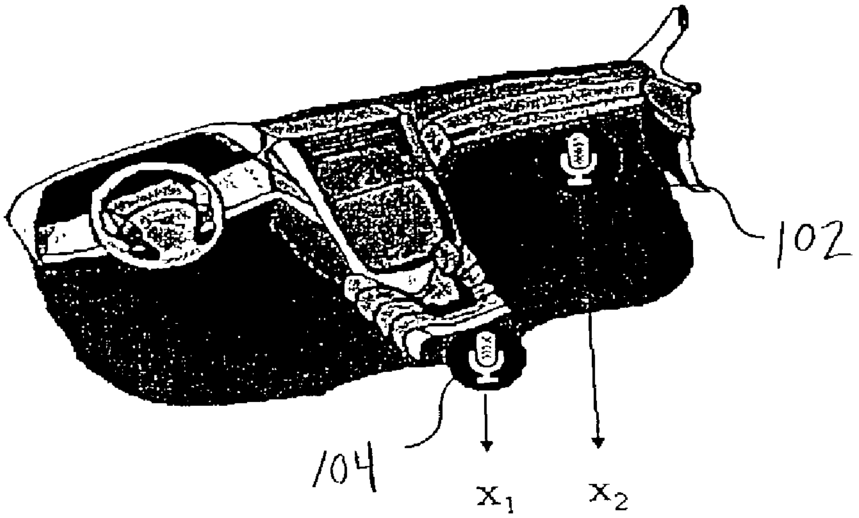
FIGS. 1A and 1B are schematic diagrams illustrating two scenarios for implementing the system and method of the present invention, where
Figure 1B:
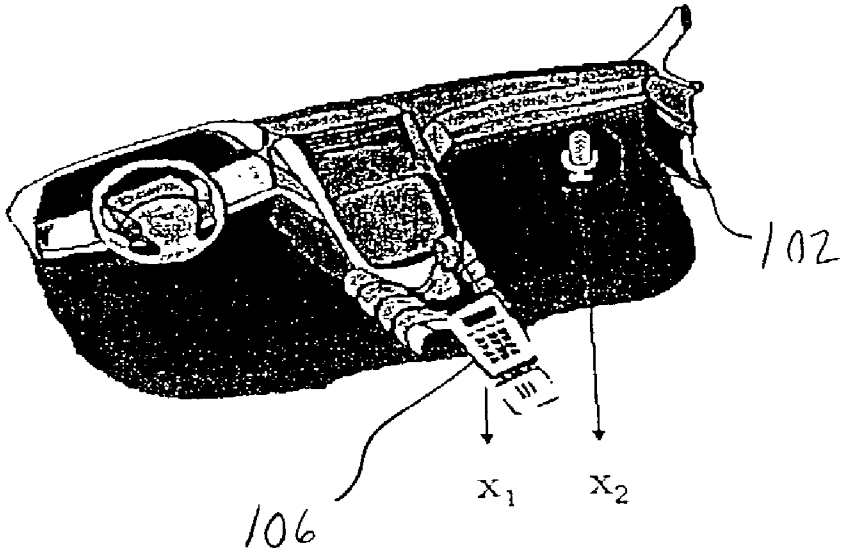

A multichannel VAD (Voice Activity Detection) system and method is provided for determining whether speech is present or not in a signal. Spatial localization is the key underlying the present invention, which can be used equally for voice and non-voice signals of interest. To illustrate the present invention, assume the following scenario: the target source (such as a person speaking) is located in a noisy environment, and two or more microphones record an audio mixture. For example as shown in FIGS. 1A and 1B, two signals are measured inside a car by two microphones where one microphone 102 is fixed inside the car and the second microphone can either be fixed inside the car 104 or can be in a mobile phone 106. Inside the car, there is only one speaker, or if more persons are present, only one speaks at a time. Assume d is the number of users. Noise is assumed diffused, but not necessarily uniform, i.e., the sources of noise are not spatially well-localized, and the spectral coherence matrix may be time-varying. Under this scenario, the system and method of the present invention blindly identifies a mixing model and outputs a signal corresponding to a spatial signature with the largest signal-to-interference-ratio (SIR) possibly obtainable through linear filtering. Although the output signal contains large artifacts and is unsuitable for signal estimation, it is ideal for signal activity detection.

To understand the various features and advantages of the present invention, a detailed description of an exemplary implementation will now be provided. In the Section 1, the mixing model and main statistical assumptions will be provided. Section 2 shows the filter derivations and presents the overall VAD architecture. Section 3 addresses the blind model identification problem. Section 4 discusses the evaluation criteria used and Section 5 discusses implementation issues and experimental results on real data.

1. Mixing Model and Statistical Assumptions

The time-domain mixing model assumes D microphone signals $x_1(t), \ldots, x_D(t)$, which record a source s(t) and noise signals $n_1(t), \ldots, n_D(t)$:

$$x_i(t) = \sum_{k=0}^{L_i} a_k^i s(t - \tau_k^i) + n_i(t),\ i = 1, \ldots, D. \tag{1}$$

where $(a_k^i, \tau_k^i)$ are the attenuation and delay on the $k^{th}$ path to microphone i, and $L_i$ is the total number of paths to microphone i.

In the frequency domain, convolutions become multiplications. Therefore, the source is redefined so that the first channel transfer function, K, becomes unity:

$$X_1(k,w)=S(k,w)+N_1(k,w)$$

$$X_2(k,w)=K_2(w)S(k,w)+N_2(k,w)$$

$$\ldots$$

$$X_D(k,w)=K_D(w)S(k,w)+N_D(k,w) \tag{2}$$

where k is the frame index, and w is the frequency index. More compactly, this model can be rewritten as $$X=KS+N \tag{3}$$

where X, K, N are complex vectors. The vector K represents the spatial signature of the source s.

The following assumptions are made: (1) The source signal s(t) is statistically independent of the noise signals $n_i(t)$, for all i; (2) The mixing parameters K(w) are either time-invariant, or slowly time-varying; (3) S(w) is a zero-mean stochastic process with spectral power $R_s(w)=E[|S|^2]$; and (4)$(N_1, N_2, \ldots, N_D)$ is a zero-mean stochastic signal with noise spectral power matrix $R_n(w)$.

2. Filter Derivations and Vad Architecture

In this section, an optimal-gain filter is derived and implemented in the overall system architecture of the VAD system.

A linear filter A applied on X produces:

$$Z=AX=AKS+AN$$

The linear filter that maximizes the SNR (SIR) is desired. The output SNR (oSNR) achieved by A is:

$$oSNR = \frac{E[|AKS|^2]}{E[|AN|^2]} = \frac{R_s AKK^* A^*}{AR_n A^*} \tag{4}$$

Maximizing oSNR over A results in a generalized eigenvalue problem: $AR_n = \lambda\ AKK^*$, whose maximizer can be obtained based on the Rayleigh quotient theory, as is known in the art:

$$A=\mu K^* R_n^{-1}$$

where ③ is an arbitrary nonzero scalar. This expression suggests to run the output Z through an energy detector with an input dependent threshold in order to decide whether the source signal is present or not in the current data frame. The voice activity detection (VAD) decision becomes:

$$VAD(k) = \begin{cases} 1 & \text{if} \quad \sum_{\omega} |Z|^2 \geq \tau \\ 0 & \text{if} \quad \text{otherwise} \end{cases} \tag{5}$$

where a threshold $\tau$ is $B|X|^2$ and $B>0$ is a constant boosting factor. Since on the one hand A is determined up to a multiplicative constant, and on the other hand, the maximized output energy is desired when the signal is present, it is determined that ③$=R_s$, the estimated signal spectral power. The filter becomes:

$$A=R_s K^* R_n^{-1} \tag{6}$$

Figure 2:
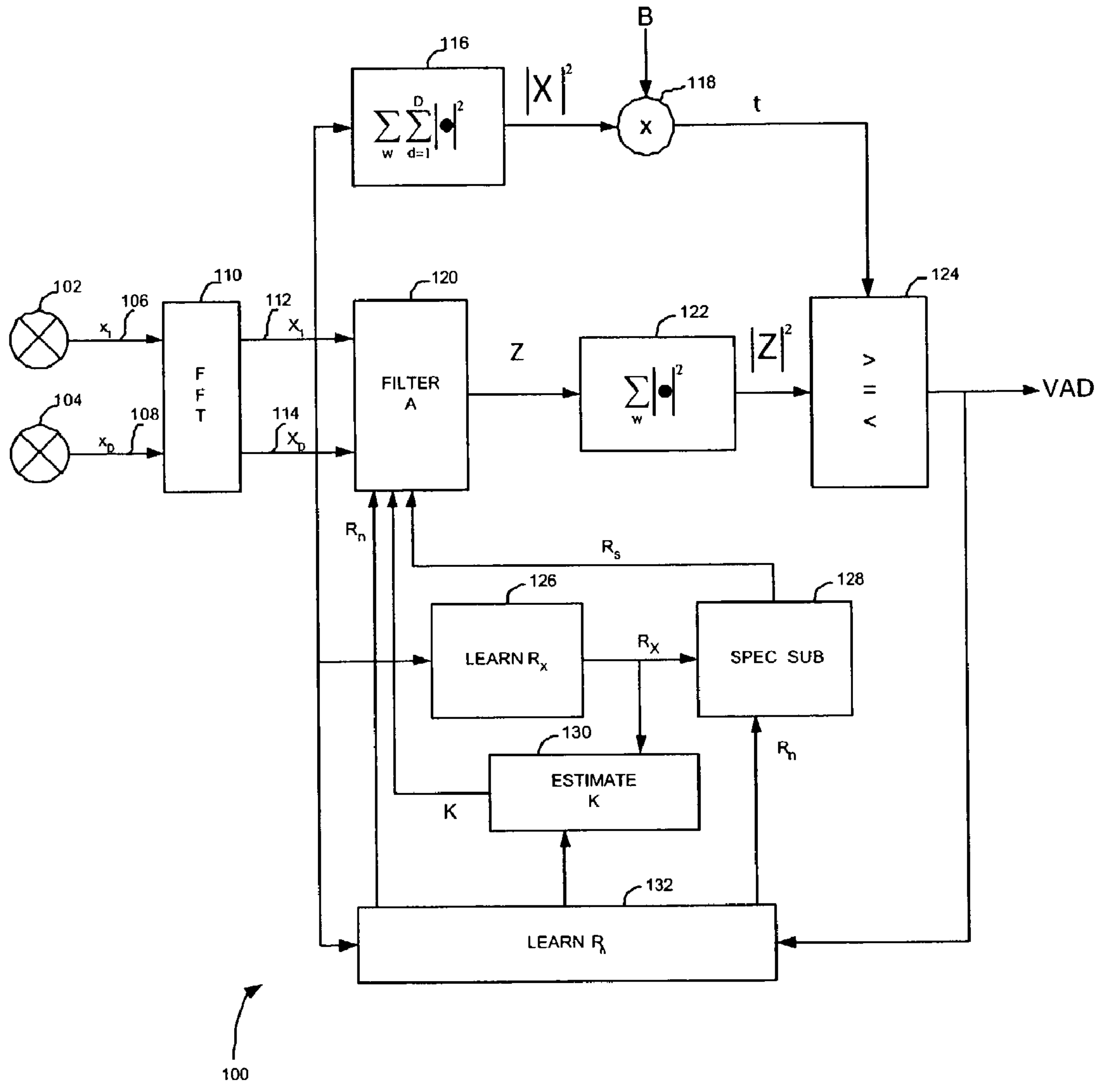
FIG. 2 is a block diagram illustrating a voice activity detection (VAD) system and method according to a first embodiment of the present invention.

Based on the above, the overall architecture of the VAD of the present invention is presented in FIG. 2. The VAD decision is based on equations 5 and 6. K, $R_s$, $R_n$ are estimated from data, as will be described below.

Referring to FIG. 2, signals $x_1$ and $x_D$ are input from microphones 102 and 104 on channels 106 and 108 respectively. Signals $x_1$ and $x_D$ are time domain signals. The signals $x_1$, $x_D$ are transformed into frequency domain signals, $X_1$ and $X_D$ respectively, by a Fast Fourier Transformer 110 and are outputted to filter A 120 on channels 112 and 114. Filter 120 processes the signals $X_1$, $X_D$ based on Eq. (6) described above to generate output Z corresponding to a spatial signature for each of the transformed signals. The variables $R_S$, $R_n$ and K which are supplied to filter 120 will be described in detail below. The output Z is processed and summed over a range of frequencies in summer 122 to produce a sum $|Z|^2$, i.e., an absolute value squared of the filtered signal. The sum $|Z|^2$ is then compared to a threshold $\tau$ in comparator 124 to determine if a voice is present or not. If the sum is greater than or equal to the threshold $\tau$, a voice is determined to be present and comparator 124 outputs a VAD signal of 1. If the sum is less than the threshold $\tau$, a voice is determined not to be present and the comparator outputs a VAD signal of 0.

To determine the threshold, frequency domain signals $X_1$, $X_D$ are inputted to a second summer 116 where an absolute value squared of signals $X_1$, $X_D$ are summed over the number of microphones D and that sum is summed over a range of frequencies to produce sum $|X|^2$. Sum $|X|^2$ is then multiplied by boosting factor B through multiplier 118 to determine the threshold $\tau$.

3. Mixing Model Identification

Now, the estimators for the transfer function ratio K and spectral power densities $R_s$ and $R_n$ are presented. The most recently available VAD signal is also employed in updating the values of K, $R_s$ and $R_n$.

3.1 Adaptive Model-Based Estimator of K

With continued reference to FIG. 2, the adaptive estimator 130 estimates a value of K, the user's spatial signature, that makes use of a direct path mixing model to reduce the number of parameters:

$$K_l(w)=a_l e^{1w\delta_l},\ l \geqq 2,\ K_1(w)=1 \tag{7}$$

The parameters ($a_l$, œ$_1$) that best fit into $$R_x(k,w)=R_s(k,w)KK^*+R_n(k,w) \tag{8}$$

are chosen uses the Frobenius norm, as is known in the art, and where $R_x$ is a measured signal spectral covariance matrix. Thus, the following should be minimized:

$$I(a_2, \ldots, a_D, \delta_2, \ldots, \delta_D) = \sum_w \text{trace}\{(R_x - R_n - R_s KK^*)^2\} \tag{9}$$

Summation above is across frequencies because the same parameters ($a_l$, œ$_l$) 2 [1[ D should explain all frequencies. The gradient of I evaluated on the current estimate ($a_l$, œ$_l$) 2[1[ D is:

$$\frac{\partial I}{\partial a_l} = -4\sum_w R_s \cdot \text{real}(K^* E v_l) \tag{10}$$

$$\frac{\partial I}{\partial \delta_l} = -2a_l \sum_w w R_s \cdot \text{imag}(K^* E v_l) \tag{11}$$

where $E=R_x-R_n-R_sKK^*$ and $v_l$ the D-vector of zeros everywhere except on the $l^{th}$ entry where it is $e^{1w}$œ$^1$, $v_l=[0 \ldots 0$ $e^{1w}$œ $0 \ldots 0]^T$. Then, the updating rule is given by $$a_l^1 = a_l - \propto \frac{\partial I}{\partial a_l} \tag{12}$$

$$\delta_l^1 = \delta_l - \propto \frac{\partial I}{\partial \delta_l} \tag{13}$$

with 0 [œ [ 1 the learning rate.

3.2 Estimation of Spectral Power Densities

The noise spectral power matrix, $R_n$, is initially measured through a first learning module 132. Thereafter, the estimation of $R_n$ is based on the most recently available VAD signal, generated by comparator 124, simply by the following:

$$R_n = \begin{cases} (1-\beta)R_n^{old} + \beta XX^* & \text{if} \quad \text{voice not present} \\ R_n^{old} & \text{if} \quad \text{voice present} \end{cases} \tag{14}$$

where $\beta$ is a floor-dependent constant. After $R_n$ is determined by Eq. (14), the result is sent to update filter 120.

The signal spectral power $R_s$ is estimated through spectral subtraction. The measured signal spectral covariance matrix, $R_x$, is determined by a second learning module 126 based on the frequency-domain input signals, $X_1$, $X_D$, and is input to spectral subtractor 128 along with $R_n$, which is generated from the first learning module 132. $R_s$ is then determined by the following:

$$R_s = \begin{cases} R_{x,11} - R_{n,11} & \text{if} \quad R_{x,11} > \beta_{SS} R_{n,11} \\ (\beta_{SS} - 1)R_{n,11} & \text{if} \quad \text{otherwise} \end{cases} \tag{15}$$

where œ$_{SS}>1$ is a floor-dependent constant. After $R_s$ is determined by Eq. (15), the result is sent to update filter 120.

4. VAD Performance Criteria

Figure 3:
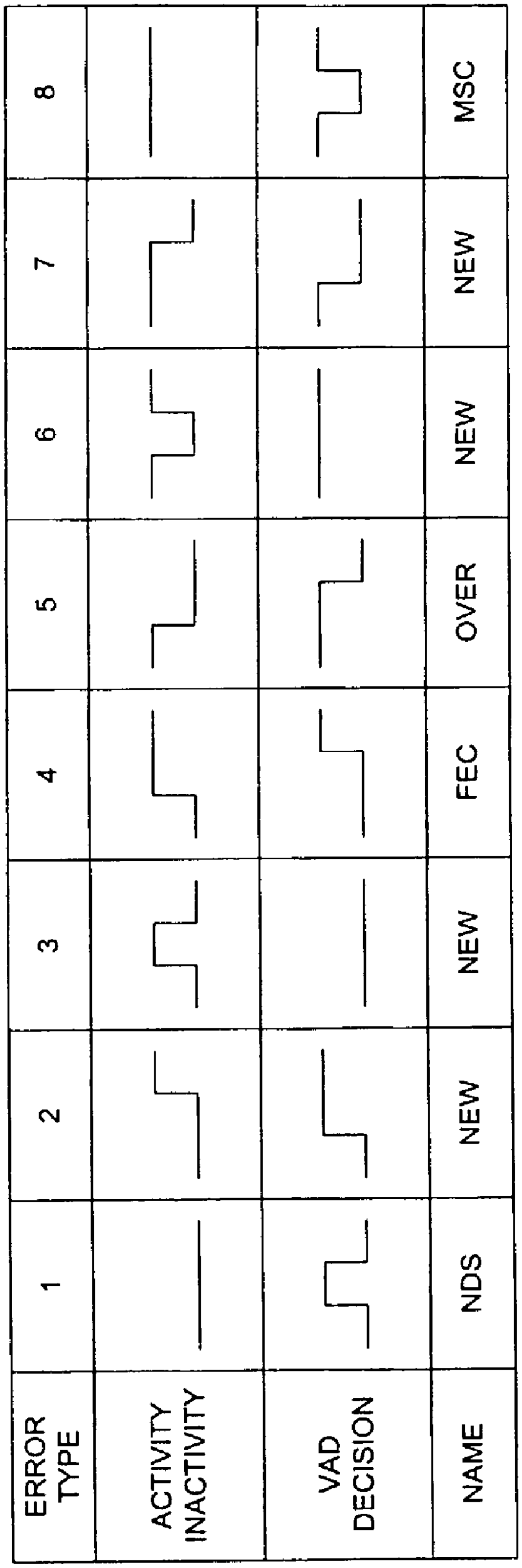
FIG. 3 is a chart illustrating the types of errors considered for evaluating VAD methods.

To evaluate the performance of the VAD system of the present invention, the possible errors that can be obtained when comparing the VAD signal with the true source presence signal must be defined. Errors take into account the context of the VAD prediction, i.e. the true VAD state (desired signal present or absent) before and after the state of the present data frame as follows (see FIG. 3): (1) Noise detected as useful signal (e.g. speech); (2) Noise detected as signal before the true signal actually starts; (3) Signal detected as noise in a true noise context; (4) Signal detection delayed at the beginning of signal; (5) Noise detected as signal after the true signal subsides; (6) Noise detected as signal in between frames with signal presence; (7) Signal detected as noise at the end of the active signal part, and (8) Signal detected as noise during signal activity.

The prior art literature is mostly concerned with four error types showing that speech is misclassified as noise (types 3,4,7,8 above). Some only consider errors 1,4,5,8: these are called "noise detected as speech" (1), "front-end clipping" (2), "noise interpreted as speech in passing from speech to noise" (5), and "midspeech clipping" (8) as described in F. Beritelli, S. Casale, and G. Ruggeri, "*Performance evaluation and comparison of itu-t/etsi voice activity detectors,*" in Proceedings ICASSP, 2001, IEEE Press.

The evaluation of the present invention aims at assessing the VAD system and method in three problem areas (1) Speech transmission/coding, where error types 3,4,7, and 8 should be as small as possible so that speech is rarely if ever clipped and all data of interest (voice but noise) is transmitted; (2) Speech enhancement, where error types 3,4,7, and 8 should be as small as possible, nonetheless errors 1,2,5 and 6 are also weighted in depending on how noisy and non-stationary noise is in common environments of interest; and (3) Speech recognition (SR), where all errors are taken into account. In particular error types 1,2,5 and 6 are important for non-restricted SR. A good classification of background noise as non-speech allows SR to work effectively on the frames of interest.

5. Experimental Results

Three VAD algorithms were compared: (1–2) Implementations of two conventional adaptive multi-rate (AMR) algorithms, AMR1 and AMR2, targeting discontinuous transmission of voice; and (3) a Two-Channel (TwoCh) VAD system following the approach of the present invention using D=2 microphones. The algorithms were evaluated on real data recorded in a car environment in two setups, where the two sensors, i.e., microphones, are either closeby or distant. For each case, car noise while driving was recorded separately and additively superimposed on car voice recordings from static situations. The average input SNR for the "medium noise" test suite was zero dB for the closeby case, and −3 dB for the distant case. In both cases, a second test suite "high noise" was also considered, where the input SNR dropped another 3 dB, was considered.

5.1 Algorithm Implementation

The implementation of the AMR1 and AMR2 algorithms is based on the conventional GSM AMR speech encoder version 7.3.0. The VAD algorithms use results calculated by the encoder, which may depend on the encoder input mode, therefore a fixed mode of MRDTX was used here. The algorithms indicate whether each 20 ms frame (160 samples frame length at 8 kHz) contains signals that should be transmitted, i.e. speech, music or information tones. The output of the VAD algorithm is a boolean flag indicating presence of such signals.

For the TwoCh VAD based on the MaxSNR filter, adaptive model-based K estimator and spectral power density estimators as presented above, the following parameters were used: boost factor B=100, the learning rates $\alpha$=0.01 (in K estimation), $\alpha$=0.2 (for $R_n$), and $\alpha_{SS}$=1.1 (in Spectral Subtraction). Processing was done block wise with a frame size of 256 samples and a time step of 160 samples.

5.2 Results

Ideal VAD labeling on car voice data only with a simple power level voice detector was obtained. Then, overall VAD errors with the three algorithms under study were obtained. Errors represent the average percentage of frames with decision different from ideal VAD relative to the total number of frames processed.

Figure 4:
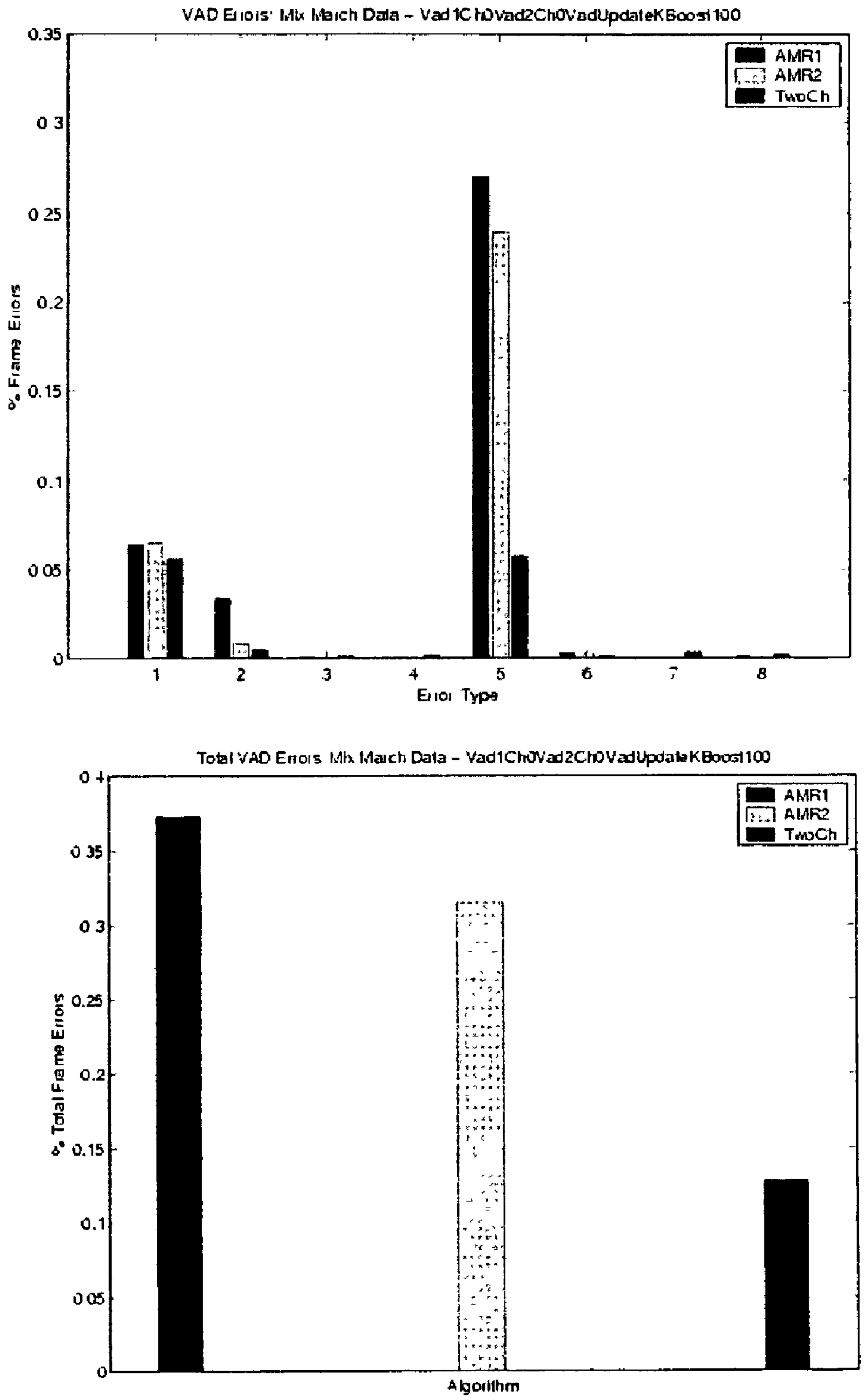
FIG. 4 is a chart illustrating frame error rates by error type and total error for a medium noise, distant microphone scenario.
Figure 5:
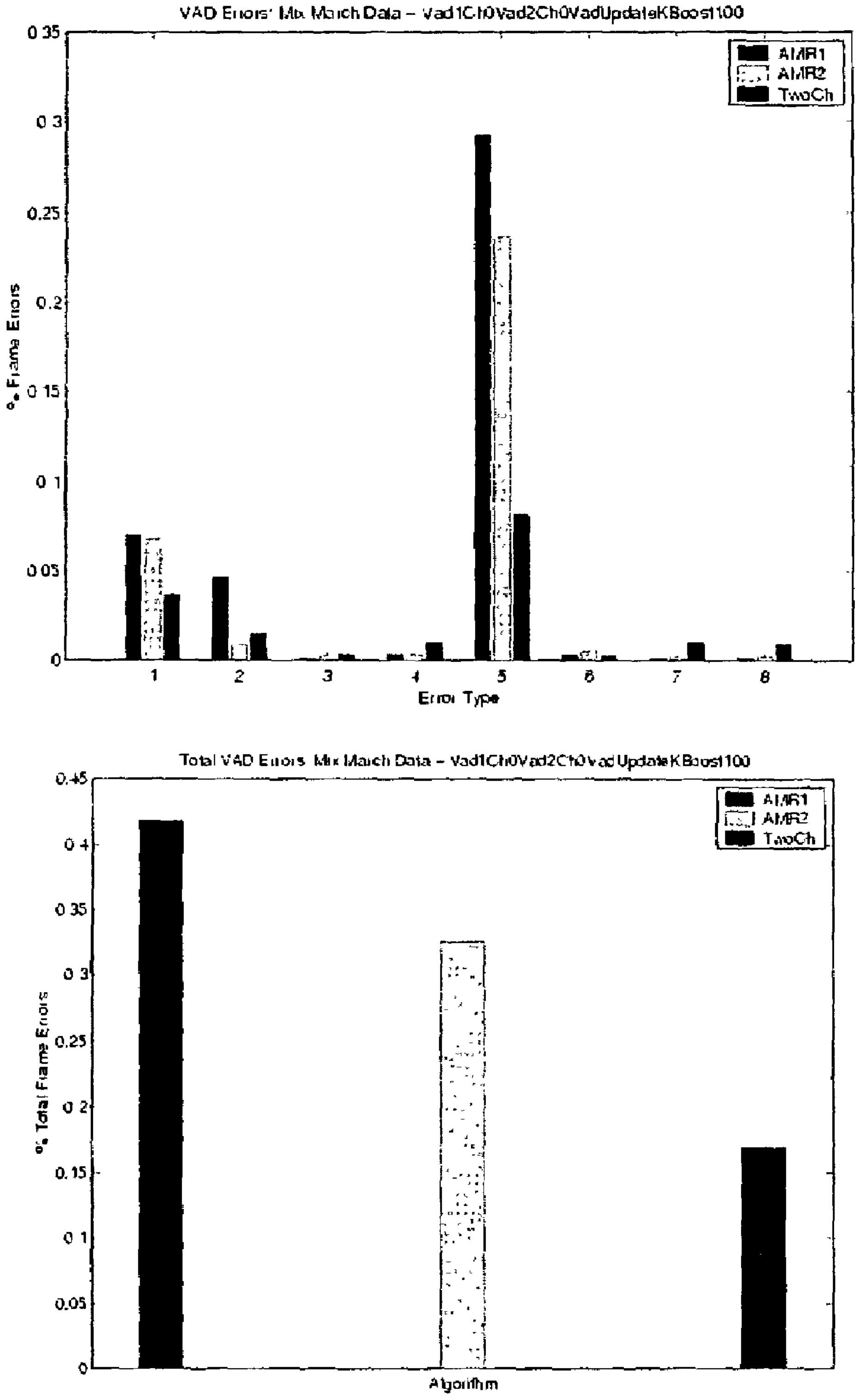
FIG. 5 is a chart illustrating frame error rates by error type and total error for a high noise, distant microphone scenario.

FIGS. 4 and 5 present individual and overall errors obtained with the three algorithms in the medium and high noise scenarios. Table 1 summarizes average results obtained when comparing the TwoCh VAD with AMR2. Note that in the described tests, the mono AMR algorithms utilized the best (highest SNR) of the two channels (which was chosen by hand).

TABLE 1

| Data | Med. Noise | High Noise |
|---|---|---|
| Best mic (closeby) | 54.5 | 25 |
| Worst mic (closeby) | 56.5 | 29 |
| Best mic (distant) | 65.5 | 50 |
| Worst mic (distant) | 68.7 | 54 |

Percentage improvement in overall error rate over AMR2 for the two-channel VAD across two data and microphone configurations.

TwoCh VAD is superior to the other approaches when comparing error types 1,4,5, and 8. In terms of errors of type 3,4,7, and 8 only, AMR2 has a slight edge over the TwoCh VAD solution which really uses no special logic or hangover scheme to enhance results. However, with different settings of parameters (particularly the boost factor) TwoCh VAD becomes competitive with AMR2 on this subset of errors. Nonetheless, in terms of overall error rates, TwoCh VAD was clearly superior to the other approaches.

Figure 6:
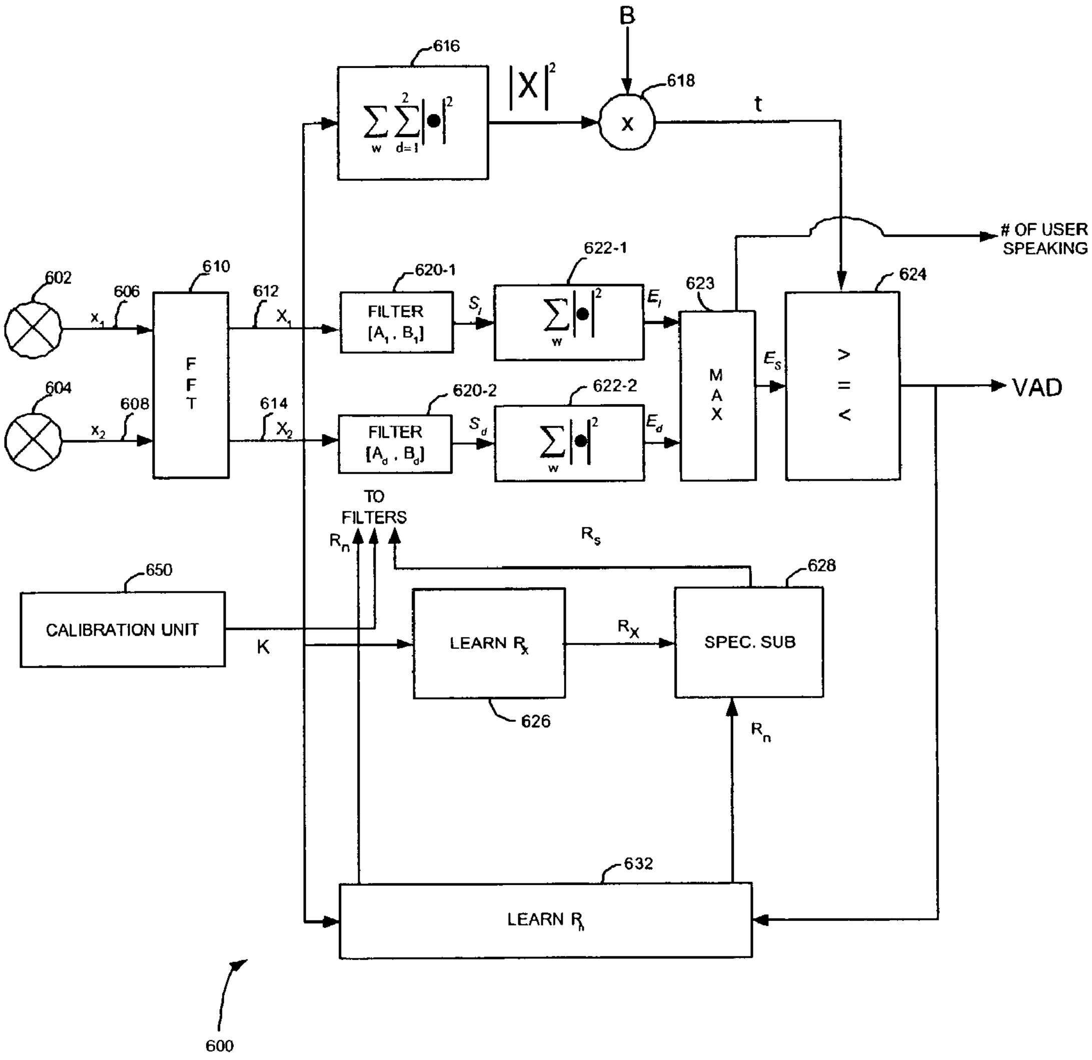
FIG. 6 is a block diagram illustrating a voice activity detection (VAD) system and method according to a second embodiment of the present invention.

Referring to FIG. 6, a block diagram illustrating a voice activity detection (VAD) system and method according to a second embodiment of the present invention is provided. In the second embodiment, in addition to determining if a voice is present or not, the system and method determines which speaker is speaking the utterance when the VAD decision is positive.

It is to be understood several elements of FIG. 6 have the same structure and functions as those described in reference to FIG. 2, and therefore, are depicted with like reference numerals and will be not described in detail with relation to FIG. 6. Furthermore, this embodiment is described for a system of two microphones, wherein the extension to more than 2 microphones would be obvious to one having ordinary skill in the art.

In this embodiment, instead of estimating the ratio channel transfer function, K, it will be determined by calibrator 650, during an initial calibration phase, for each speaker out of a total of d speakers. Each speaker will have a different K whenever there is sufficient spatial diversity between the speakers and the microphones, e.g., in a car when the speakers are not sitting symmetrically with respect to the microphones.

During the calibration phase, in the absence (or low level) of noise, each of the d users speaks a sentence separately. Based on the two clean recordings, $x_1(t)$ and $x_2(t)$ as received by microphones 602 and 604, the ratio channel transfer function K(ω) is estimated for an user by:

$$K(\omega) = \frac{\sum_{l=1}^{F} X_2^c(l, \omega)\overline{X_1^c(l, \omega)}}{\sum_{l=1}^{F} |X_1^c(l, \omega)|^2} \tag{16}$$

where $X_1^c(l,\omega), X_2^c(l,\omega)$ represents the discrete windowed Fourier transform at frequency ω, and time-frame index l of the clean signals $x_1$, $x_2$. Thus, a set of ratios of channel transfer functions $K_l(\omega)$, $1 \leqq l \leqq d$, one for each speaker, is obtained. Despite of the apparently simpler form of the ratio channel transfer function, such as $$K(\omega) = \frac{X_2^c(\omega)}{X_1^c(\omega)},$$

a calibrator 650 based directly on this simpler form would not be robust. Hence, the calibrator 650 based on Eq. (16) minimizes a least-square problem and thus is more robust to non-linearities and noises.

Once K has been determined for each speaker, the VAD decision is implemented in a similar fashion to that described above in relation to FIG. 2. However, the second embodiment of the present invention detects if a voice of any of the d speakers is present, and if so, estimates which one is speaking, and updates the noise spectral power matrix $R_n$ and the threshold τ. Although the embodiment of FIG. 6 illustrates a method and system concerning two speakers, it is to be understood that the present invention is not limited to two speakers and can encompass an environment with a plurality of speakers.

After the initial calibration phase, signals $x_1$ and $x_2$ are input from microphones 602 and 604 on channels 606 and 608 respectively. Signals $x_1$ and $x_2$ are time domain signals. The signals $x_1$, $x_2$ are transformed into frequency domain signals, $X_1$ and $X_2$ respectively, by a Fast Fourier Transformer 610 and are outputted to a plurality of filters 620-1, 620-2 on channels 612 and 614. In this embodiment, there will be one filter for each speaker interacting with the system. Therefore, for each of the d speakers, $1 \leqq l \leqq d$, compute the filter becomes:

$$[A_l B_l] = R_s [1 \overline{K_l}] R_n^{-1} \tag{17}$$

and the following is outputted from each filter 620-1, 620-2:

$$S_l = A_l X_1 + B_l X_2 \tag{18}$$

The spectral power densities, $R_s$ and $R_n$, to be supplied to the filters will be calculated as described above in relation to the first embodiment through first learning module 626, second learning module 632 and spectral subtractor 628. The K of each speaker will be inputted to the filters from the calibration unit 650 determined during the calibration phase.

The output $S_l$ from each of the filters is summed over a range of frequencies in summers 622-1 and 622-2 to produce a sum $E_l$, an absolute value squared of the filtered signal, as determined below:

$$E_l = \sum_{\omega} |S_l(\omega)|^2 \tag{19}$$

As can seen from FIG. 6, for each filter, there is a summer and it can be appreciated that for each speaker of the system 600, there is a filter/summer combination.

The sums $E_l$ are then sent to processor 623 to determine a maximum value of all the inputted sums ($E_1, \ldots E_d$), for example $E_s$, for $1 \leqq s \leqq d$. The maximum sum $E_s$ is then compared to a threshold τ in comparator 624 to determine if a voice is present or not. If the sum is greater than or equal to the threshold τ, a voice is determined to be present, comparator 624 outputs a VAD signal of 1 and it is determined user s is active. If the sum is less than the threshold τ, a voice is determined not to be present and the comparator outputs a VAD signal of 0. The threshold τ is determined in the same fashion as with respect to the first embodiment through summer 616 and multiplier 618.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The present invention presents a novel multichannel source activity detector that exploits the spatial localization of a target audio source. The implemented detector maximizes the signal-to-interference ratio for the target source and uses two channel input data. The two channel VAD was compared with the AMR VAD algorithms on real data recorded in a noisy car environment. The two channel algorithm shows improvements in error rates of 55–70% compared to the state-of-the-art adaptive multi-rate algorithm AMR2 used in present voice transmission technology.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for determining if a voice is present in mixed sound signals, the method comprising the steps of:

receiving at least two mixed sound signals by at least two microphones;

Fast Fourier transforming the at least two received mixed sound signals into at least two transformed signals in the frequency domain;

filtering the at least two transformed signals to output a filtered signal corresponding to a spatial signature of each source of a voice;

summing a squared absolute value of each of the filtered signals over a predetermined range of frequencies; and comparing the sum to a derived threshold to determine if a voice is present, wherein if the sum is greater than or equal to the threshold, a voice is present, and if the sum is less than the threshold, a voice is not present.

2. The method as in claim 1, further comprising the step of deriving the threshold, including:

summing a squared absolute value of the at least two transformed signals;

summing the summed transformed signals over a predetermined range of frequencies to produce a second sum; and multiplying the second sum by a boosting factor to thereby derive the threshold.

3. The method as in claim 1, wherein the filtering step includes multiplying the at least two transformed signals by a product of an inverse of a noise spectral power, a vector of channel transfer function ratios based on the spatial signature of each source, and a source signal spectral power.

4. The method as in claim 3, wherein the channel transfer function ratios are determined by a direct path mixing model.

5. The method as in claim 3, wherein the source signal spectral power is determined by spectrally subtracting the noise spectral power from a measured signal spectral covariance matrix.

6. A method for determining if a voice is present in mixed sound signals, the method comprising the steps of:

receiving at least two mixed sound signals produced by at least two microphones;

Fast Fourier transforming each of the at least two received mixed sound signals into at least two transformed signals in the frequency domain;

filtering the at least two transformed signals to output filtered signals corresponding to a spatial signature for each of a number of users, each user producing a respective voice;

summing separately for each of the users a squared absolute value of the filtered signals over a predetermined range of frequencies and producing respective sums;

determining a maximum of the sums; and comparing the maximum sum to a derived threshold to determine if a voice is present, wherein if the maximum sum is greater than or equal to the threshold, a voice is present, and if the maximum sum is less than the threshold, a voice is not present.

7. The method as in claim 6, wherein if a voice is present, a specific user associated with the maximum sum is determined to be the active speaker.

8. The method as in claim 6, further comprising the step of deriving the threshold, including:

summing a squared absolute value of the at least two transformed signals;

summing the summed transformed signals over a predetermined range of frequencies to produce a second sum; and multiplying the second sum by a boosting factor to derive the threshold.

9. The method as in claim 6, wherein the filtering step includes multiplying the at least two transformed signals by a product of an inverse of a noise spectral power, a vector of channel transfer function ratios based on the spatial signature of each user, and a source signal spectral power.

10. The method as in claim 9, wherein the filtering step is performed for each of the number of users and the channel transfer function ratio is measured for each user during a calibration to produce the vector of channel transfer function ratios.

11. The method as in claim 9, wherein the source signal spectral power is determined by spectrally subtracting the noise spectral power from a measured signal spectral covariance matrix.

12. A voice activity detector for determining if a voice is present in mixed sound signals comprising:

at least two microphones for receiving and producing at least two mixed sound signals;

a Fast Fourier transformer for transforming the at least two mixed sound signals into at least two transformed signals in the frequency domain;

a filter for filtering the at least two transformed signals to output a filtered signal corresponding to a spatial signature for each source of a voice;

a first summer for summing a squared absolute value of each of the filtered signals over a predetermined range of frequencies; and a comparator for comparing the sum from the first summer to a threshold derived from the at least two transformed signals to determine if a voice is present, wherein if the sum is greater than or equal to the threshold, a voice is present, and if the sum is less than the threshold, a voice is not present.

13. The voice activity detector as in claim 12, further comprising:

a second summer for summing a squared absolute value of the at least two transformed signals and for summing the summed transformed signals over a predetermined range of frequencies to produce a second sum; and a multiplier for multiplying the second sum by a boosting factor to derive the threshold.

14. The voice activity detector as in claim 12, wherein the filter includes a multiplier for multiplying the transformed signals by an inverse of a noise spectral power, a vector of channel transfer function ratios, and a source signal spectral power to determine the filtered signal corresponding to a spatial signature of each source.

15. The voice activity detector as in claim 14, further including a spectral subtractor for spectrally subtracting the noise spectral power from a measured signal spectral covariance matrix to determine the signal spectral power.

16. A voice activity detector for determining if a voice is present in mixed sound signals comprising:

at least two microphones for receiving at least two respective mixed sound signals;

a Fast Fourier transformer for transforming each received mixed sound signal into respective transformed signals in the frequency domain;

at least one filter for filtering the transformed signals to output a signal corresponding to a spatial signature for each of a number of users producing a respective voice;

at least one first summer for summing separately for each of the users a squared absolute value of the filtered signals over a predetermined range of frequencies;

a processor for determining a maximum of the sums; and a comparator for comparing the determined maximum sum to a threshold derived from the transformed signals to determine if a voice is present, wherein if the sum is greater than or equal to the threshold, a voice is present, and if the sum is less than the threshold, a voice is not present.

17. The voice activity detector as in claim 16, wherein if a voice is present, a specific user associated with the maximum sum is determined to be the active speaker.

18. The voice activity detector as in claim 16, further comprising a second summer for summing a squared absolute value of the transformed signals and for summing the summed transformed signals over a predetermined range of frequencies to produce a second sum; and a multiplier for multiplying the second sum by a boosting factor to derive the threshold.

19. The voice activity detector as in claim 16, wherein the at least one filter includes a multiplier for multiplying the transformed signals by a product formed of an inverse of a noise spectral power, a vector of channel transfer function ratios, and a source signal spectral power to determine the signal corresponding to the spatial signature for each of the users.

20. The voice activity detector as in claim 19, further comprising a calibration unit for determining the channel transfer function ratio for each user during a calibration.

21. The voice activity detector as in claim 19, further including a spectral subtractor for spectrally subtracting the noise spectral power from a measured signal spectral covariance matrix to determine the signal spectral power.

22. A program storage device readable by machine, tangibly embodying a program of instructions executable by the machine to perform method steps for determining if a voice is present in mixed sound signals, the method steps comprising:

receiving at least two mixed sound signals by at least two microphones;

Fast Fourier transforming the at least two received mixed sound signals into at least two transformed signals in the frequency domain;

filtering the at least two transformed signals to output a signal corresponding to a spatial signature of each source of a voice and producing filtered signal;

summing a squared absolute value of the filtered signal over a predetermined range of frequencies; and comparing the sum to a threshold derived from the at least two transformed signals to determine if a voice is present, wherein if the sum is greater than or equal to the threshold, a voice is present, and if the sum is less than the threshold, a voice is not present.

* * * * *